United States Patent [19]

Miller

[11] Patent Number: 4,837,612
[45] Date of Patent: Jun. 6, 1989

[54] AUTOMATIC HUE CORRECTOR APPARATUS AND METHOD WITH A CAPABILITY TO CORRECT WIDE ANGLE DEMODULATOR HUE SIGNAL DISTORTION CREATED IN RESPONSE TO PREDOMINANTLY GREEN HUE ENVIRONMENTS

[75] Inventor: William G. Miller, Knoxville, Tenn.

[73] Assignee: North American Philips Corporation, New York, N.Y.

[21] Appl. No.: 163,494

[22] Filed: Mar. 3, 1988

[51] Int. Cl.⁴ ............................................. H04N 9/68
[52] U.S. Cl. ........................................ 358/28; 358/27
[58] Field of Search ................................... 358/27, 28

[56] References Cited

U.S. PATENT DOCUMENTS

| | | | |
|---|---|---|---|
| 3,558,806 | 1/1971 | Monshan | 358/30 |
| 3,729,578 | 4/1973 | Slusarki | 358/27 |
| 3,749,825 | 7/1973 | Moore | 358/28 |
| 3,783,186 | 1/1974 | Slavik et al. | 358/28 |
| 3,816,846 | 6/1974 | Nero et al. | 358/28 |
| 3,843,958 | 10/1974 | Furrey | 358/27 |
| 3,922,713 | 11/1975 | Wheeler | 358/28 |
| 4,219,840 | 8/1980 | Srivastava | 358/28 |
| 4,285,005 | 8/1981 | Srivastava | 358/28 |
| 4,506,293 | 3/1985 | Hurst | 358/37 |
| 4,558,351 | 12/1985 | Fling | 358/28 |
| 4,633,299 | 12/1986 | Tanaka | 358/28 |
| 4,642,682 | 2/1987 | Orsburn | 358/80 |

FOREIGN PATENT DOCUMENTS 80891 5/1982 Japan ................................. 358/28

OTHER PUBLICATIONS

Harwood, A Chrominance Demodulator IC with Dynamic Flesh Correction Linear Integrated Circuits, Application Note ICAN-6472.
Flesh Color Corrector IC for Color TV, Sanyo LA7690.

Primary Examiner—John W. Shepperd
Attorney, Agent, or Firm—Marianne R. Rich

[57] ABSTRACT

Color distortion created in non-standard decoding matrices is corrected by sensing potential differences between hue representative signals and applying correction potentials representative of these potential differences to color representative signals experiencing the greatest distortion.

10 Claims, 2 Drawing Sheets

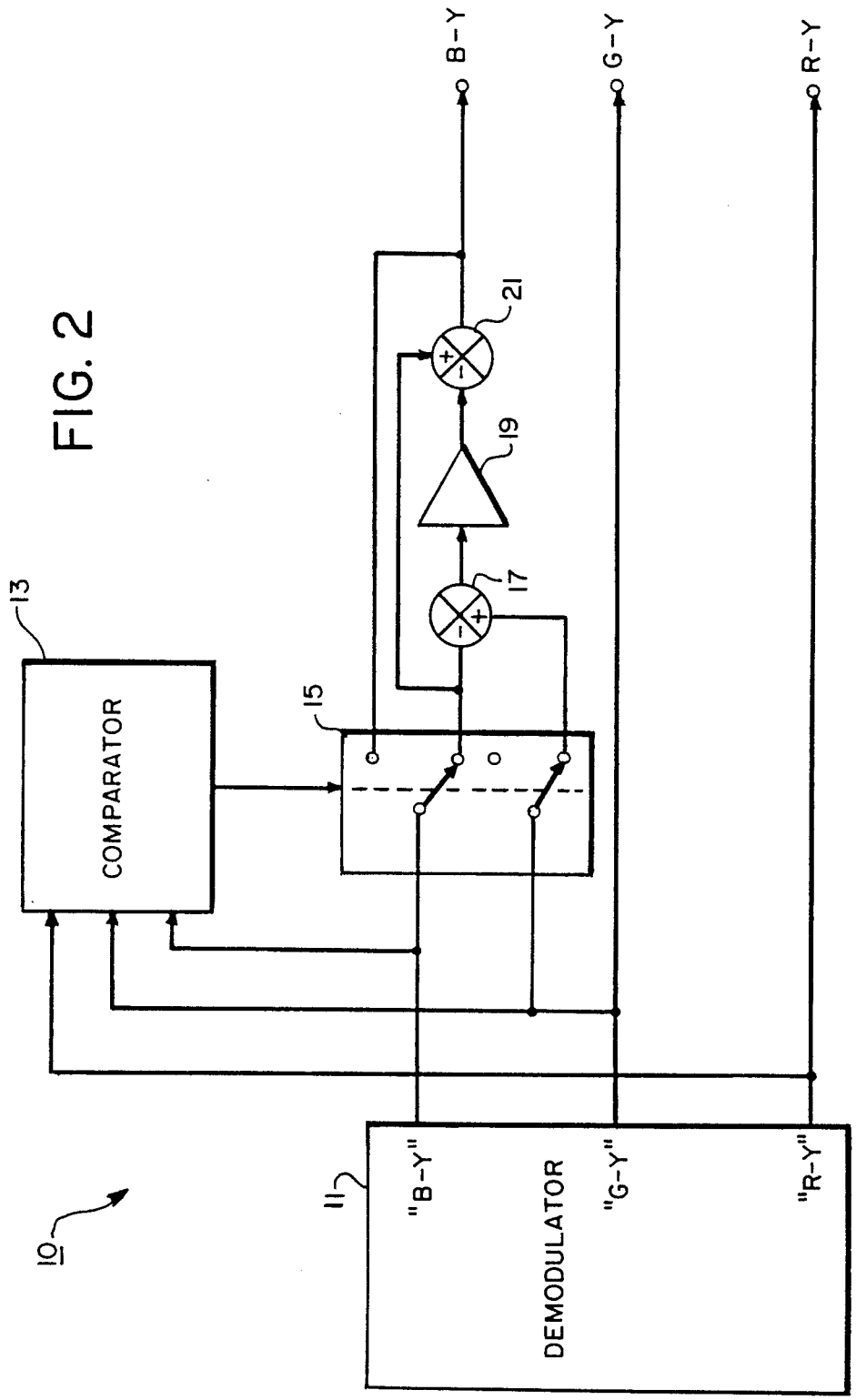

AUTOMATIC HUE CORRECTOR APPARATUS AND METHOD WITH A CAPABILITY TO CORRECT WIDE ANGLE DEMODULATOR HUE SIGNAL DISTORTION CREATED IN RESPONSE TO PREDOMINANTLY GREEN HUE ENVIRONMENTS

BACKGROUND OF THE INVENTION

1. Field of the Invention

The invention relates generally to color correction in television systems and more particularly to corrections of hue distortions due to non-standard decoding matrices in color television receivers and monitors.

2. Description of the Prior Art

The color information in color television signals, as broadcast, is contained in I and Q signals, the Q signal being transmitted on the same carrier but in quadrature with the I signal. Demodulation at the receiver differs for various receiver types. The I and Q components may be demodulated directly, or as color difference components, R-Y, B-Y, and G-Y, i.e. color difference signals may be derived. When, at the receiver, the color difference signals are demodulated to correspond as closely as possible to the corresponding values at the transmitter, the demodulated signals are referred to as standard color difference signals or standard chroma signals herein.

However, in current receiver design practice, the chroma signals, whether I and Q or color difference signals, are not demodulated to yield the standard signals, but, instead, are demodulated such that the Q signal is effectively decreased relative to the I signal. This is done to maintain more accurately reproduced flesh tones in the picture on the television screen. For receivers in which a demodulator directly furnishes the color difference signals, the hue error reduction is accomplished by choice of demodulation angles and gain ratios for the color difference components which result in an effective Q signal decrease. Chroma signals which have been modified in this manner, i.e. to maintain more uniformity in flesh tones, are herein referred to as modified chroma signals. Virtually all television receivers presently on the market have varying degrees of flesh tone correction, i.e. operate with modified chroma signals.

The modification of the chroma signals described above has, however, an undesirable effect in that the modified B-Y signal is distorted from the standard value. This causes a bluish tinge which is particularly objectionable when viewed with picture components having a predominantly green hue, such as grass foliage.

SUMMARY OF THE INVENTION

It is an object of the present invention to retain the flesh tone modification accomplished by the nonstandard demodulation technique described above, while selectively correcting the simultaneously produced undesired hue modifications.

The present invention is a method for correcting undesired hue distortion in a video receiver generating modified red, green, and blue chroma signals for improved flesh tone presentation. In a first step, a first signal is generated when comparison of the modified red, green and blue chroma signals to each other indicates that the modified green chroma signal exceeds the other two. In response to the first signal, a correction signal is added to the blue chroma signal.

In a preferred embodiment, the amplitude of the correction signal corresponds to the difference in potential between the modified green chroma signal and the larger of the modified red and modified blue chroma signals.

The invention also comprises apparatus for carrying out the above method.

BRIEF DESCRIPTION OF THE DRAWINGS

FIG. 2 is a block diagram of a preferred embodiment for green hue distortion correction.

DESCRIPTION OF THE PREFERRED EMBODIMENTS

As mentioned above, the color information in a color television signal is transmitted as I and Q signals, the I and Q signals being based in turn on matrixed red, green, and blue primary signals. A luminance (Y) signal, which is a combination of the three chrominance signal ($Y = 0.30R + 0.59G + 0.11B$) is also transmitted.

The standard color difference signals can be derived from the received I and Q signals as shown, for example, in the Television Engineering Handbook, K. Blair Benson, McGraw Hill, Inc., 1986, page 21.50. Rescaled, the blue color difference signal is attenuated by a factor of 2.03, while the red color difference signal is attenuated by a factor of 1.14. The re-scaled signals are indicated as V and U in FIG. 1. For "standard" decoding without flesh tone correction, R-Y would lie along the V axis, with a gain of 1.14, B-Y along the U axis, with a gain of 2.03, while the green difference signal, divided by a factor of 0.703 would lie along an axis extending at 236 degrees to the zero or U axis.

Figure 1:
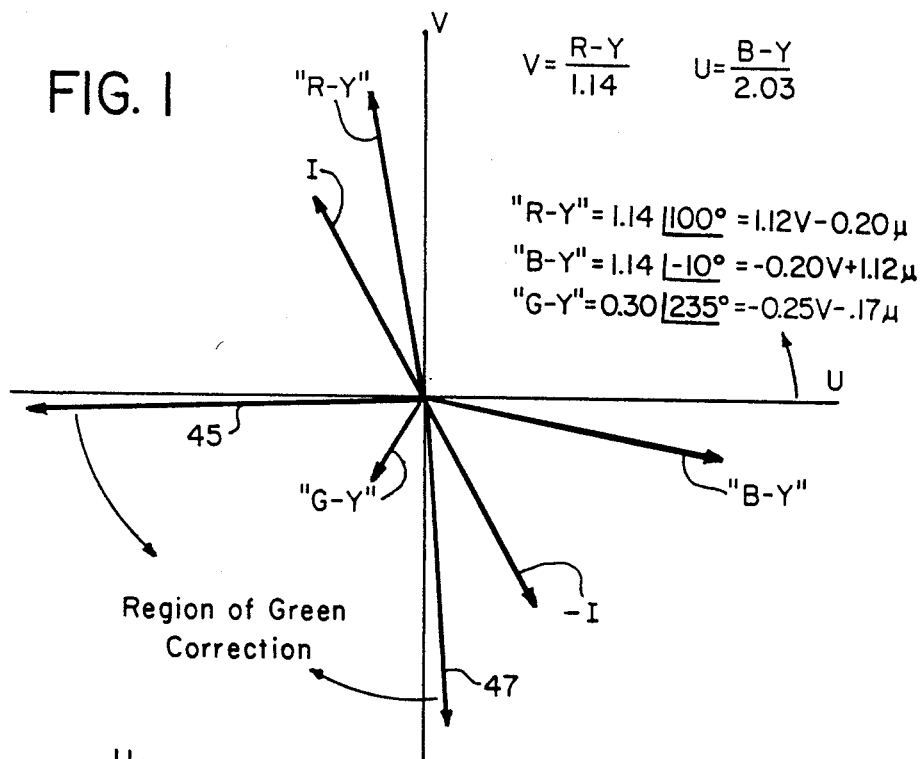
FIG. 1 is a plot of the output signals provided by a non-standard decoding matrix, illustrating thereon the gain ratios and demodulated angles for the three output signals.

The "R-Y", "B-Y", and "G-Y" signals illustrated in FIG. 1 are the corresponding signals derived form a matrix which includes modification of these signals to achieve flesh tone correction. The I and −I axes are also indicated. It will be noted that the modified red color difference signal ("R-Y"), is pulled towards the +1 axis, while the "B-Y" signal, athough with decreased amplitude, is pulled toward the −Y axis. This combination causes the desired correction of the flesh tones. However, in addition, the phase angle and amplitude changes of the blue color difference signal result in a decidedly bluish overcast to any pure green component. Since viewers are particularly sensitive to color errors in grass and foliage known to be green, this bluish tint or overcast is particularly objectionable."

Relative chrominance and luminance signals, as well a the unmodified and modified demodulated components, resulting from a pure green hue transmission are shown in the following table.

| R | G | B | Y | R-Y | G-Y | B-Y | V | u | "R-Y" | "G-Y" | "B-Y" |
|---|---|---|---|---|---|---|---|---|---|---|---|
| 0 | 1 | 0 | 0.59 | −0.59 | 0.41 | −0.59 | −0.52 | −0.29 | −0.52 | 0.18 | −0.22 | where: V, u, "R-Y", "G-Y", and "B-Y" are defined in FIG. 1.

It is obvious from this table, that the most significant error is in the "B-Y" signal which is not sufficiently negative. This relatively high value of the "B-Y" signal will cause a significant bluish tinge on the screen on what should be pure green color. This distortion of green may be corrected with the compensation network generally shown as 10 in FIG. 2. The three modified output signals from a demodulator 11 are coupled to a comparator 13 wherefrom a switching signal is provided when the modified G-Y demodulated signal exceeds both the modified R-Y and B-Y signals. When this condition exists, the modified B-Y signal is subtracted from the modified G-Y signal in differencing network 17 and the resulting signal is coupled to an amplifier 19 which may have a gain less than unity. The amplified signal is then coupled to the inverting terminal of a second differencing circuit wherein it is subtracted from the modified blue signal coupled to the non-inverting terminal to provide the compensated signal. For a pure green transmitted signal, the output of the differencing circuit is 0.40, which if amplified with a gain factor of 0.75 provides a signal of 0.30 to the inverting terminal of the differencing circuit 21. Subtracting this value from the −0.22 level of the modified B-Y signal, gives a signal with the relative value of −0.52. With this compensation, the relative levels at the B-Y, G-Y, and R-Y output terminals are respectively −0.52, 0.18, and −0.52 which are in substantially the same relative relationship as the unmodified and uncompensated signals for a pure green hue. When the modified G-Y signal is less than both the modified B-Y and R-Y signals, switch 15 is positioned to remove the compensating circuit and apply the modified blue signal directly to the output terminal.

Figure 3:
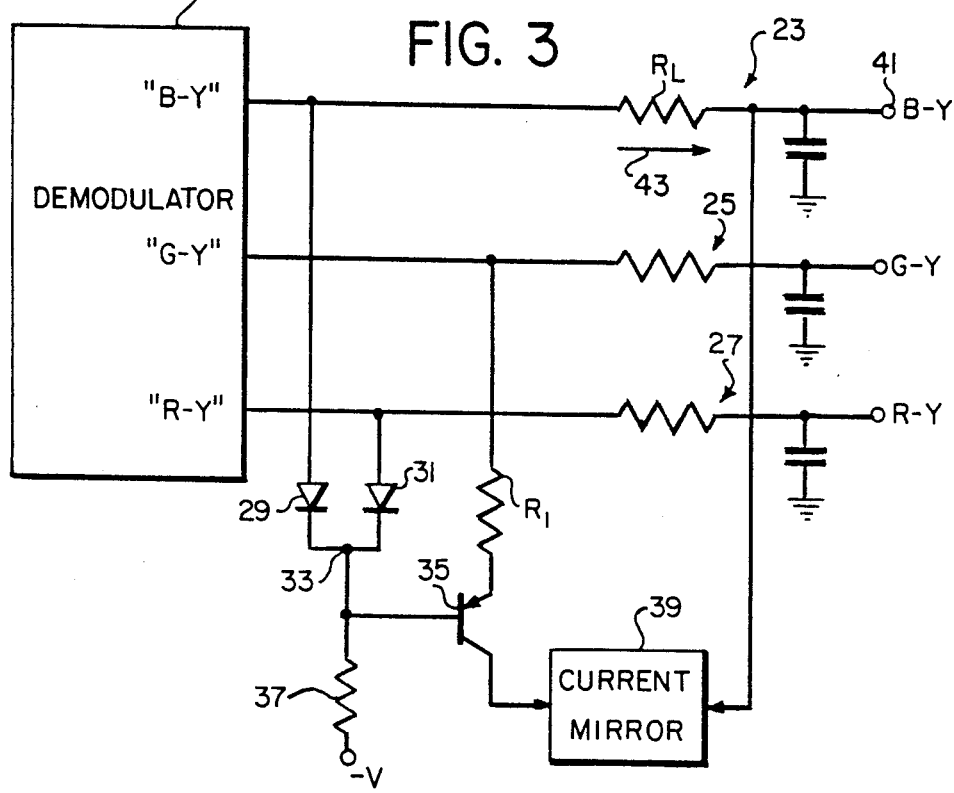
FIG. 3 is a circuit diagram of a preferred embodiment of the invention which is capable of performing the block functions of FIG. 2.

Refer now to FIG. 3, wherein a schematic diagram of a preferred embodiment of the invention is shown. It should be recognized that the positioned order of the demodulator terminals is arbitrary and that the order may be any of the six possible permutations available. The modified B-Y, G-Y, and R-Y signals is the output terminals of the demodulator 111 may be coupled respectively to low pass filters 23, 25, and 27. In addition, the modified B-Y signal is coupled to the anode of a diode 29 and the modified R-Y signal is coupled to the anode of a diode 31. The cathodes of these two diodes are joined to form a node 33 which is coupled to the base of a p-n-p transistor 35 and to a source of bias voltage, not shown, via a resistor 37. The emitter of a transistor 35 is coupled to the modified G-Y output terminal of demodulator 11 via a resistor $R_1$, while the collector of transistor 35 is coupled to a current mirror 39. The arrangement of the diodes and the biasing voltage permits only one diode to conduct at a time, except when B-Y=R-Y. Since the higher anode voltage of the diodes 29, 31 appears at the node 33 the diode having the higher anode voltage establishes a cathode voltage on the other diode that is greater than its anode voltage, thereby causing the diode to cut off. When the voltage at the node 33 is less than the voltage at the modified G-Y output terminal of demodulator 11, transistor 35 conducts and couples a current to the current mirror 39 that is equal to the potential difference between the voltage at the modified G-Y output terminal and the voltage at the node 33. This current is reversed by the current mirror 39 and causes a current to flow through the resistor $R_L$ that decreases the potential at the B-Y terminal 41. This correction to the B-Y output terminal is provided whenever the voltage at the modified G-Y output terminal of the demodulator 11 exceeds both the voltage at the modified B-Y and that at the modified R-Y output terminal of demodulator 11.

The operation of the circuit of FIG. 3 may be illustrated by example with the pure green reception described above. In this situation, the −0.22 voltage at the modified B-Y output terminal, which is greater than −0.52 volts, establishes a −0.22 voltage at the base of transistor 35 which conducts to establish a voltage at one side of the resistor $R_1$ of −0.22 volts. Since the other side of the resistor $R_1$ is coupled to the modified G-Y terminal of the demodulator 11, whereat a 0.18 voltage exists, the voltage across the resistor $R_1$ is 0.4 volts. The current $I_1$ which is equal to $0.40/R_1$ is coupled to the collector of transistor 35 and therefrom to the current mirror 39, whereat it is reversed and caused to flow through the resistor $R_L$, in the direction indicated by the arrow 43, to establish an additional voltage drop across this resistor that is equal to $0.40 R_L/R_1$. If the ratio $R_L/R_1$ is equal to 0.75, an additional voltage drop of 0.3 volts is realized across the resistor $R_L$. Since the voltage at the modified B-Y output terminal is equal to −0.22, the total voltage at the output terminal 41 is therefore −0.52. In this manner, the relative voltages of −0.52, 0.18, and −0.52 are respectively established at the B-Y, G-Y, and R-Y output terminals.

The compensation circuitry remains in operation while both the modified B-Y output voltage or the modified R-Y output voltage are less than the modified G-Y voltage. Consequently, a region of operation exists between a vector for which the modified G-Y and modified B-Y voltages are equal and a vector for which the modified G-Y and modified R-Y vectors are equal. This region may be determined by solving the equations $$\text{"B-Y"} - 0.20\,V + 1.12\mu = q$$

$$\text{"G-Y"} - 0.25\,V - 0.17\mu = q$$

(These 1st pair equations define boundary for equal B-Y & G-Y)
and $$(\text{"R-Y"})\,1.12\,V - 0.20\mu = k$$

$$\text{"G-Y"} - 0.25\,V - 0.17\mu = k$$

(These 2nd pair equations define boundary for equal R-Y & G-Y)

The solution of the first pair of equations provides an angle of 181.2 degrees for the B-Y boundary as indicated by the vector 45 in FIG. 1 and an angle of 273.23 degrees for the R-Y boundary as indicated by the vector 47 in FIG. 1.

It should be apparent that the function of the comparator 13 and switch 15 is performed by the combination of diode 29, diode 31, and transistor 35; the function of the first differencing circuit 17 is performed by resistor $R_1$ in cooperation with transistor 35; the function of the amplifier 19 is performed by the combination of resistors $R_1$ and $R_L$; and the function of the second differencing circuit 21 is performed by the combination of the current mirror 39 and the resistor $R_L$.

While the invention has been described in its preferred embodiments, it is to be understood that the words which have been used are words of description rather than limitation and that changes may be made within the purview of the appended claims without departing from the true scope and spirit of the invention its broader aspects.

I claim:

1. An apparatus for correcting chroma distortion created in a hue decoding matrix providing chroma signals with respective potentials modified to achieve flesh-tone corrections thereby providing modified signals comprising:

comparator means coupled to said decoding matrix to receive said modified signals for providing output signals representative of relative modified signal levels;

switching means coupled to said decoding matrix to receive a plurality of said modified signals and responsive to said output signals for switching said plurality of modified signals between first and second switch positions;

first combining means coupled to said switching means for combining at least selected ones of said plurality of modified signals in a predetermined manner to provide combined signals when said switching means is in said first position; and second combining means coupled to said first combining means to receive said combined signals and to said hue decoding matrix when said switching means is in said first position to receive at least one of said modified signals for providing hue corrected signals at an output terminal, said at least one modified signal being directly coupled to said output terminal and said first and second combining means being decoupled from said decoding matrix when said switching means is in said second position.

2. An apparatus for correcting chroma distortion created in a hue decoding matrix having first, second, and third output terminals respectively provided first, second, and third chroma signals with respective potentials modified to achieve flesh-tone corrections comprising:

means coupled to said first and second output terminals for selecting that one chroma signal of said first and second chroma signals having greater potential;

means coupled to said selecting means to receive said selected chroma signal and to said third output terminal for providing a current proportional to potential differences between said third chroma signal and said selected chroma signal when said third chroma signal exceeds said selected chroma signal; and means coupled to said first output terminal and coupled to said current means to receive said current for converting said current to a correction potential and adding said correction potential to said first chroma signal potential.

3. The chroma correcting apparatus of claim 2 wherein said selecting means comprises first and second unidirectional current conducting means coupled respectively to said first and second output terminal for providing that signal of said first and second chroma signals having greater potential to said current means.

4. The chroma correcting apparatus of claim 2 wherein said current means comprises:

a transistor having a base coupled to said selecting means, an emitter, and a collector;

a resistor coupled between said third output terminal and said emitter;

a current mirror having an input terminal coupled to said collector and an output terminal; and a resistor coupled between said first output terminal and said output terminal of said current mirror.

5. The chroma correcting apparatus of claim 4 wherein said selecting means comprises first and second diodes each having a first pole respectively coupled to said first and second output terminals and a second pole coupled to said base.

6. The chroma correcting apparatus of claim 5 wherein said first, second, and third chroma signals are representative of blue, red, and green, respectively.

7. The apparatus of claim 3 wherein said first, second, and third chroma signals are representative of blue, red, and green, respectively.

8. Method for correcting color distortion in green subject matter resulting from modification of standard red, green, and blue chroma signals to create modified red, green, and blue chroma signals having improved flesh tones, comprising the steps of:

comparing said modified red, green, and blue chroma signals to each other and generating a first signal indicative of a predominantly green hue;

generating a correction signal corresponding to an amplitude difference between said modified green chroma signal and a selected one of said modified blue and red chroma signals; and applying said correction signal to said modified blue chroma signal in response to said first signal.

9. A method as set forth in claim 8, wherein said step of applying said correction signal to said modified blue chroma signal comprises adding said correction signal to said modified blue chroma signal.

10. Apparatus for correcting color distortion in green subject matter resulting from modification of standard red, green, and blue chroma signals to create modified red, green, and blue chroma signals having improved flesh tones, comprising comparator means for comparing said modified red, green, and blue signals to each other and generating a first signal indicative of a predominantly green hue;

means responsive to said modified red, green, and blue chroma signals for generating a correction signal corresponding to an amplitude difference between said modified green chroma signal and a selected one of said modified blue and red chroma signals; and means for applying said correction signal to said modified blue chroma signal.

* * * * *